United States Patent
Xavier et al.

(10) Patent No.: US 7,707,861 B2
(45) Date of Patent: May 4, 2010

(54) VEHICLE LOCK

(75) Inventors: Eric Xavier, Middletown, NY (US); Adam Xavier, Middletown, NY (US)

(73) Assignee: New Hampton Technologies LLC, Middletown, NY (US)

(*) Notice: Subject to any disclaimer, the term of this patent is extended or adjusted under 35 U.S.C. 154(b) by 0 days.

(21) Appl. No.: 12/404,187

(22) Filed: Mar. 13, 2009

(65) Prior Publication Data

US 2009/0173117 A1 Jul. 9, 2009

Related U.S. Application Data

(63) Continuation of application No. 11/845,290, filed on Aug. 27, 2007, now abandoned, which is a continuation-in-part of application No. 11/425,564, filed on Jun. 21, 2006, now abandoned, and a continuation-in-part of application No. 11/350,573, filed on Feb. 9, 2006, now Pat. No. 7,467,530.

(60) Provisional application No. 60/823,548, filed on Aug. 25, 2006, provisional application No. 60/703,745, filed on Jul. 29, 2005.

(51) Int. Cl.
*E05B 67/36* (2006.01)

(52) U.S. Cl. .................... 70/33; 70/56; 70/226; 70/233; 188/265

(58) Field of Classification Search ........................ 70/2, 70/32–34, 56, 225–228, 233, 237; 188/265
See application file for complete search history.

(56) References Cited

U.S. PATENT DOCUMENTS

| 1,140,209 A | 5/1915 | Taylor |
|---|---|---|
| 1,434,156 A | 10/1922 | Schnaars |
| 2,104,981 A | 1/1938 | Falk |
| 2,656,704 A | 10/1953 | Mancuso |
| 3,914,965 A | 10/1975 | Paxton |
| 3,968,985 A | 7/1976 | Nielsen et al. |
| 4,013,311 A | 3/1977 | Prezioso |
| 4,033,159 A | 7/1977 | Bennett |
| 4,038,847 A | 8/1977 | Bennett |
| 4,073,165 A | 2/1978 | Grundstrom et al. |
| 4,133,193 A | 1/1979 | Sanada et al. |

(Continued)

FOREIGN PATENT DOCUMENTS

DE 10316708 11/2003

(Continued)

*Primary Examiner*—Suzanne D Barrett
(74) *Attorney, Agent, or Firm*—Fish & Richardson P.C.

(57) ABSTRACT

The brake bolt and the lock cylinder of the vehicle lock are mounted in a part of the vehicle for preventing the rotation of a wheel of the vehicle in a locked state. The brake bolt and lock cylinder are mounted in a brake bolt bore and a lock bore, respectively, located in the swing arm, the chain guard, or a lock body mounted over the axle-retaining nut. The vehicle lock engages a ventilation hole on the rotor, a ventilation hole on the sprocket, the teeth of the sprocket, or a hole on the hub to prevent rotation of the wheel in the locked state. Preferably, the lock cylinder is mounted to the vehicle in both the locked state and the unlocked state, and in the unlocked state the brake bolt is removed from the brake bolt bore for operation of the vehicle.

8 Claims, 11 Drawing Sheets

U.S. PATENT DOCUMENTS

| | | | |
|---|---|---|---|
| 4,171,823 A | 10/1979 | Nemes | |
| 4,294,090 A | 10/1981 | Metzger | |
| 4,986,096 A | 1/1991 | Soehner et al. | |
| 5,133,201 A | 7/1992 | LaMott et al. | |
| 5,265,451 A | 11/1993 | Phifer | |
| 5,291,761 A | 3/1994 | Lii | |
| 5,345,794 A | 9/1994 | Jenks | |
| D352,223 S | 11/1994 | Shieh | |
| 5,365,758 A | 11/1994 | Shieh | |
| 5,379,618 A | 1/1995 | Shieh | |
| 5,388,436 A | 2/1995 | Shieh | |
| 5,442,941 A | 8/1995 | Kahonen et al. | |
| 5,467,618 A | 11/1995 | Shieh | |
| 5,492,206 A | 2/1996 | Shieh | |
| 5,499,518 A | 3/1996 | Shieh | |
| 5,507,160 A | 4/1996 | Shieh | |
| 5,515,947 A | 5/1996 | Shieh | |
| 5,517,837 A | 5/1996 | Wang | |
| 5,530,427 A | 6/1996 | Shieh | |
| 5,694,797 A | 12/1997 | Kuo | |
| D391,832 S | 3/1998 | McDaid | |
| 5,730,012 A | 3/1998 | Link | |
| 5,736,924 A | 4/1998 | Shieh | |
| 5,819,889 A | 10/1998 | Shieh | |
| 5,823,025 A | 10/1998 | Phifer | |
| 5,916,279 A | 6/1999 | Shieh | |
| 5,946,952 A | 9/1999 | Mintchenko | |
| 5,964,107 A | 10/1999 | Chang | |
| 5,987,939 A | 11/1999 | Pitisettakarn | |
| 6,009,731 A | 1/2000 | Emmons et al. | |
| 6,178,787 B1 | 1/2001 | Titterton | |
| 6,199,416 B1 | 3/2001 | Wu | |
| 6,230,530 B1 | 5/2001 | Voigt et al. | |
| 6,394,283 B1 | 5/2002 | Fletcher | |
| 6,437,459 B1 | 8/2002 | Politi | |
| 6,453,706 B1 | 9/2002 | Chen | |
| 6,457,336 B1 | 10/2002 | Bremicker | |
| 6,464,269 B1 | 10/2002 | Wilhelm et al. | |
| 6,497,300 B2 | 12/2002 | Mori et al. | |
| 6,553,793 B1 | 4/2003 | Chen | |
| 6,615,624 B2 | 9/2003 | Cardwell | |
| 6,675,614 B2 | 1/2004 | Lai | |
| 6,981,954 B2 | 1/2006 | Huang | |
| 6,994,192 B1 | 2/2006 | Chang | |
| 7,076,976 B1 | 7/2006 | Goldman | |
| 7,080,530 B2 | 7/2006 | Haas | |
| 7,210,316 B1 | 5/2007 | Falconer et al. | |
| 2002/0130180 A1 | 9/2002 | Stobbe | |
| 2003/0188938 A1 | 10/2003 | Li | |
| 2004/0031298 A1 | 2/2004 | Lai | |
| 2005/0103584 A1 | 5/2005 | Hogesta | |
| 2005/0132763 A1 | 6/2005 | Haas | |
| 2005/0252257 A1 | 11/2005 | Woods et al. | |
| 2006/0096342 A1 | 5/2006 | Muerza | |
| 2006/0112739 A1 | 6/2006 | Hogesta | |
| 2008/0100418 A1 | 5/2008 | Stobbe et al. | |

FOREIGN PATENT DOCUMENTS

| | | |
|---|---|---|
| EP | 0676318 | 10/1995 |
| EP | 0716007 | 6/1996 |
| EP | 1479599 | 11/2004 |
| GB | 2292920 | 3/1996 |
| GB | 2310839 | 9/1997 |
| TW | 519075 | 1/2003 |
| WO | 03/051707 | 6/2003 |

VEHICLE LOCK

REFERENCE TO RELATED APPLICATIONS

This application is a continuation patent application of U.S. application Ser. No. 11/845,290 filed Aug. 27, 2007, which claims priority to U.S. Provisional Application No. 60/823,548, filed Aug. 25, 2006, entitled "VEHICLE LOCK", and is a continuation-in-part patent application of copending application Ser. No. 11/425,564, filed Jun. 21, 2006, entitled "VEHICLE LOCK," which is a continuation-in-part patent application of U.S. application Ser. No. 11/350,573 filed Feb. 9, 2006, now U.S. Pat. No. 7,467,530, entitled "VEHICLE LOCK," which claims one or more inventions which were disclosed in Provisional Application No. 60/703,745 filed Jul. 29, 2005, entitled "RECREATIONAL VEHICLE LOCK." The benefit under 35 USC §119(e) of the United States provisional application is hereby claimed, and the aforementioned applications are hereby incorporated herein by reference.

BACKGROUND OF THE INVENTION

1. Field of the Invention

The invention pertains to the field of locks. More particularly, the invention pertains to vehicle locks.

2. Description of Related Art

Two major problems exist with currently available rotor locks for motorcycles and other recreational-type vehicles. First, they do not eliminate fore and aft movement of the wheel or track. Second, when not in use, i.e. when the lock is in an unlocked state, they must be stored somewhere other than on the motorcycle wheel.

When using immobilizers on vehicles, such as motorcycles, mopeds, ATVs, and snowmobiles, there is a need to prevent the possibility of accidental damage to the rotor, caliper, or wheel rim of the vehicle. To satisfy this requirement, it is necessary to eliminate any and all forward or rearward slack between the immobilizing member and the rotor, caliper, or wheel of the vehicle.

One drawback to conventional external locking mechanisms on vehicle braking systems is the slack in the locking point. This slack can cause damage to braking parts when forward and rearward movement takes place. Conventional locking mechanisms offer some wheel immobilization, but allow room for unwanted forward and rearward movement.

Additionally, the application of external locking mechanisms of the prior art creates the possibility of locking mechanism misplacement and locking mechanism storage difficulties on small vehicles. Externally applied locking mechanisms need to be placed into storage when the vehicle is in use, therefore creating a burden on the user to find a storage location. This inconvenience to the user may lead the user to avoid using the vehicle lock on a regular basis. Therefore, there is a need in the art for both a fully immobilizing rotor lock and a permanently mounted rotor lock that remains on the vehicle, does not need to be stored, and is much more convenient for the user.

SUMMARY OF THE INVENTION

The brake bolt and the lock cylinder of the vehicle lock are mounted in a part of the vehicle for preventing the rotation of a wheel of the vehicle in a locked state. The brake bolt and lock cylinder are mounted in a brake bolt bore and a lock bore, respectively, located in the swing arm, the chain guard, or a lock body mounted over the axle-retaining nut. The vehicle lock engages a ventilation hole on the rotor, a ventilation hole on the sprocket, the teeth of the sprocket, or a hole on the hub to prevent rotation of the wheel in the locked state. Preferably, the lock cylinder is mounted to the vehicle in both the locked state and the unlocked state, and in the unlocked state the brake bolt is removed from the brake bolt bore for operation of the vehicle.

The vehicle lock is for a vehicle having at least one wheel or track. The vehicle lock includes a lock cylinder and a brake bolt. The lock cylinder is mounted to the vehicle in a lock bore in both a locked state and an unlocked state. The brake bolt includes at least one deadbolt shaft mounted in a brake bolt bore in the locked state. In the unlocked state the brake bolt is removed from the brake bolt bore for operation of the vehicle. In the locked state the deadbolt shaft is aligned to extend into at least one recess, thereby preventing rotation of the wheel or track.

In one embodiment, the lock bore and the deadbolt bore are located in a swing arm of the vehicle. In another embodiment, the lock bore and the deadbolt bore are located in an extension of a swing arm of the vehicle. In yet another embodiment, the lock bore and the deadbolt bore are located in a chain guard of the vehicle.

In one embodiment, the recess is a ventilation hole in a brake rotor of the wheel or track. In another embodiment, the recess is a ventilation hole in a sprocket of the wheel or track. Preferably, the deadbolt shaft has a pair of prongs with a distance between the prongs such that each prong inserts into an end of the ventilation hole to prevent movement of the sprocket in the locked state. In yet another embodiment, the recess is a gap between a pair of teeth in a sprocket of the wheel or track. Preferably, the deadbolt shaft has at least two prongs such that each prong inserts into a different gap in the sprocket in the locked state. In another embodiment, the recess is a hole in a hub of the wheel or track.

In another embodiment of the invention, the vehicle lock includes a lock body including an attached portion and a hinged portion. The attached portion is mounted over an axle-retaining nut of the wheel or track. The hinged portion is rotatably connected to the attached portion by a hinge. The lock bore and the deadbolt bore are located in the hinged portion such that in the locked state the hinged portion is extended away from the attached portion and the deadbolt shaft is aligned to extend into a recess.

DETAILED DESCRIPTION OF THE INVENTION

Figure 1:
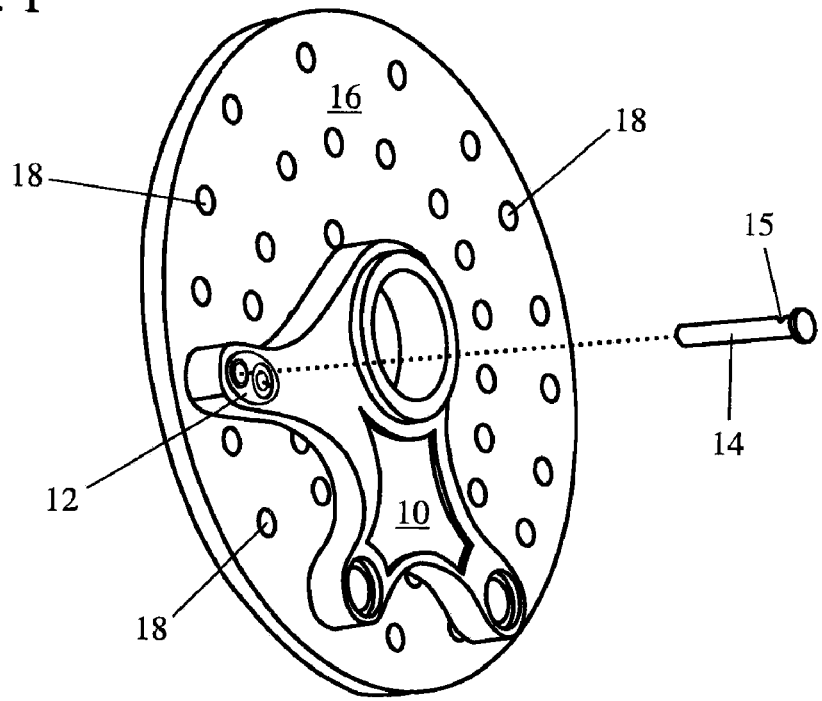
FIG. 1 shows a lock assembly on a rear brake caliper mounting bracket of a motorcycle in an embodiment of the present invention.

The vehicle lock of the present invention is preferably used on a wheeled vehicle, including, but not limited to, a motorcycle, a moped, an all-terrain vehicle (ATV), or a snowmobile, to immobilize at least one wheel or track. The vehicle lock may be used on any vehicle without a full enclosure of the operating controls, including locking doors or hatches, such that the vehicle could be moved manually. This includes any recreational-type vehicle with an open air rider position. The vehicle lock of the present invention prevents the vehicle from being wheeled anywhere when it is engaged.

When the vehicle lock of the present invention is used for a motorcycle, it is preferably designed to be integrated into the motorcycle's brake caliper mounting bracket or the brake caliper itself. A factory brake caliper bracket is subject to high amounts of lateral load at any given time during operation of the motorcycle. Lateral load on the axis of the bracket is transferred down the axis to the caliper bracket-to-frame mounting point. This is where the axle passes through the bracket perpendicular to the bracket's axis at the vertex, transforming the lateral load into torsion. This torsion is absorbed by the axle and rear frame of the motorcycle.

When the rear brake is applied to a motorcycle, the brake pads in the brake caliper press against the lateral surfaces of the rotating brake rotor. Friction is created and the kinetic energy from the momentum of the motorcycle is transferred from the brake rotor to the brake caliper via the pads. The kinetic energy is transferred to the brake caliper via the lateral force. If the caliper is situated above the axle, the brake caliper is forced toward the front of the motorcycle. The caliper bracket holds the caliper in place. The lateral force previously transferred to the caliper is now transferred on the same plane to the caliper bracket, so it remains a lateral load. The lateral load travels down the axis of the caliper bracket to the vertex (where the axle passes through the bracket), and the energy is then transferred to the axle and rear frame via torsion (twisting force). The integrity of the brake caliper bracket is maintained, because it is designed to withstand high lateral forces created from a motorcycle in motion.

Motorcycle manufacturers determine exactly how much lateral and torsion load each bracket must withstand. The caliper bracket is subject to extremely high loads, yet it is inexpensive in design and manufacture. The vehicle lock of the present invention preferably does not alter the fundamental design of the manufacturer's brake caliper bracket. Instead, the vehicle lock of the present invention is preferably an addition to the bracket, much like the brake caliper itself.

The brake caliper bracket of a motorcycle, or even an automobile for that matter, is the strongest part of that vehicle. The lateral load exerted on the brake caliper bracket of a motorcycle traveling at 180 miles per hour (MPH) when the rider vigorously applies the brake is many times greater than the load exerted on a rotor lock by a human trying to roll a parked motorcycle forward.

In a preferred embodiment of the present invention, the lock bracket replaces the Manufacturer's bracket. A deadbolt shaft, preferably made of hardened steel, stainless steel, titanium, tungsten, or boron, extends from the bracket to the brake rotor in a locked state to prevent any movement of the locked wheel with respect to the bracket, thereby making the vehicle undrivable. The strength of the bracket and the deadbolt shaft preserve the integrity of the lock and prevent or deter theft of the vehicle. The wrap-around design of the present invention encases the brake caliper in the same manner that the neighboring brake caliper does.

The lateral load exerted on the lock in the event of an attempted theft is shouldered by the deadbolt shaft, which passes through the cross-drilled ventilation hole of the brake rotor perpendicular to its axis. The deadbolt shaft is seated in the lock on either side by a bushing, which is preferably made of hardened steel. The "lateral load" state is preserved by the wrap-around design, and is transferred to the axle and frame in the same manner as the lateral loads captured by the brake caliper. If a single-sided lock were used, the lateral load would be converted into torsion at the deadbolt-to-rotor contact and the integrity of the brake caliper bracket would be compromised.

In a preferred embodiment, the lock is a motorcycle lock. The wrap-around design of the lock preserves the integrity of the locking mechanism even in the case of an extreme destruction event, such as if the bracket is cut by a cutting tool, such as a Dremel® tool, and removed from the rotor. In the event of bracket destruction, the wheel may no longer be completely immobilized, but the lock mechanism remains attached to the rotor. The wheel is not able to rotate fully, as the lock mechanism comes into contact with the brake caliper or the motorcycle frame within one revolution, thus keeping the motorcycle immobilized.

A lock of the present invention is an adaptation of the factory rear brake caliper bracket. The lock's construction preferably retains the factory measurements in regards to caliper mounting-point locations, frame mounting-point locations, and aesthetic finish. The bracket preferably meets or exceeds all standards of the original equipment manufacturer (OEM). However, the materials used for the construction yield a brake caliper bracket that withstands much higher lateral and torsion loads. The lock adds minimal weight to the rear of the motorcycle and does not hinder performance in any way.

Each vehicle lock of the present invention is preferably customized to a specific vehicle model. The lock body of the vehicle lock is preferably permanently mounted to the vehicle. When the vehicle lock is engaged, the user carries no more than a key to engage/disengage the lock. When the vehicle lock is disengaged, the user carries no more than the key and the brake bolt/deadbolt assembly, which is preferably of similar size and weight as the key.

Referring to FIG. 1, in a rear brake embodiment, a vehicle lock of the present invention is a self-contained unit housed within the caliper mounting bracket (10). The caliper mounting bracket (10) is preferably of original equipment specifications to the applicable model of vehicle. The lock is preferably used on any vehicle using a disc braking system. Some vehicles upon which the lock of the present invention may be used include, but are not limited to, motorcycles, mopeds, ATVs, and snowmobiles. The locking mechanism (12) is securely mounted in the caliper mounting bracket (10). The locking mechanism (12) includes a locking cylinder (not shown) and an externally applied deadbolt shaft (14) with a locking notch (15) closer to one end to be locked into place. The deadbolt shaft (14), when locked, enters the rotor (16) through one of the plurality of cross-drilled ventilation holes (18).

The caliper mounting bracket (10) is preferably made of cast or milled aluminum or steel meeting or exceeding OEM-specified strength. The locking mechanism (12) is preferably made of strengthened steel housing the internal components creating a locking body able to secure the deadbolt shaft (14) into place through one of the cross-drilled ventilation holes (18).

Figure 2:
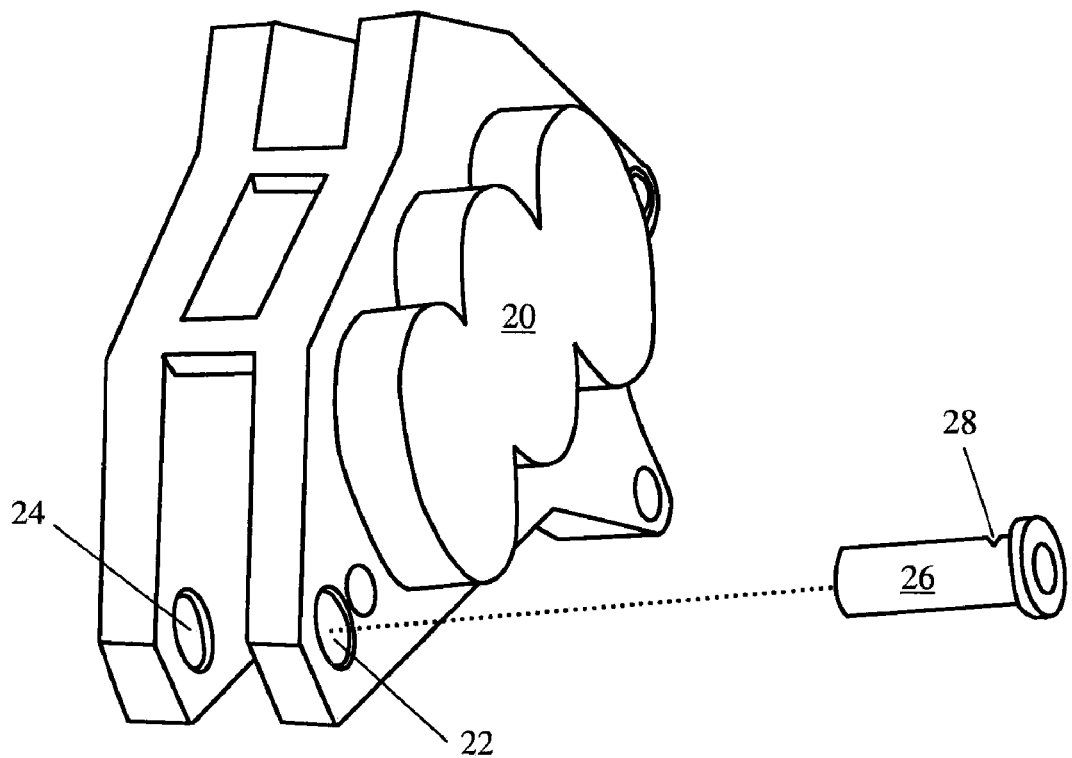
FIG. 2 shows a lock assembly on a front brake caliper housing in an embodiment of the present invention.

Referring to FIG. 2, in a front brake embodiment, a vehicle lock of the present invention is a self-contained unit housed within the caliper (20). The caliper (20) is preferably of original equipment specifications to each applicable model of vehicle. The lock is preferably used on any vehicle using a disc braking system. Some vehicles upon which the lock of the present invention may be used include, but are not limited to, motorcycles, mopeds, ATVs, and snowmobiles. The locking mechanism (22) is securely mounted in the caliper (20). Additionally, the caliper (20) employs a deadbolt receiver (24) on the opposite side of the locking mechanism (22) to ensure placement of the deadbolt shaft (26). In one embodiment, the deadbolt shaft is made of steel, strengthened steel, or stainless steel. However, the deadbolt shaft may be made of any metal or alloy of equal or greater tensile strength than steel, including, but not limited to, titanium, tungsten, or boron. The locking mechanism (22) includes a locking cylinder and an externally applied deadbolt shaft (26) with a locking notch (28) closer to one end to be locked into place. The deadbolt shaft (26), when locked, enters the rotor (not shown) through one of the plurality of cross-drilled ventilation holes (not shown). The caliper (20) is preferably made of cast or milled aluminum meeting or exceeding OEM-specified strength. The locking mechanism (22) is preferably made of strengthened steel housing the internal components creating a locking body able to secure the deadbolt shaft (26) into place.

Figure 3:
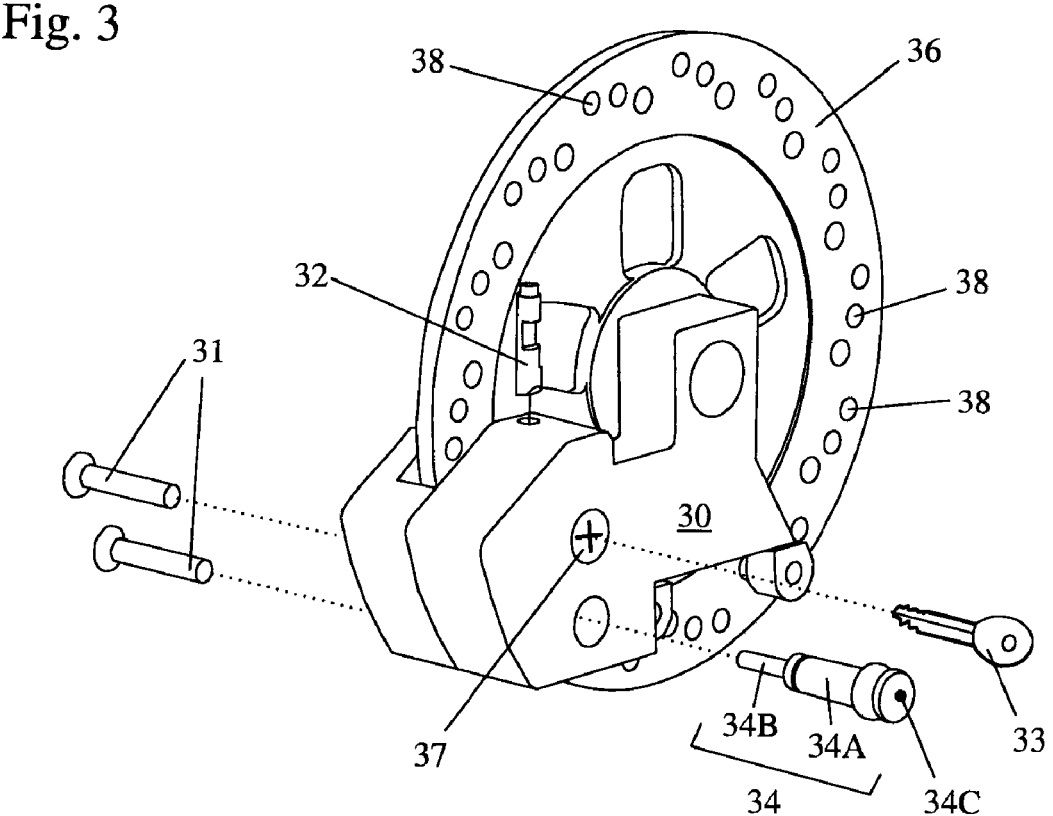
FIG. 3 shows a lock assembly in an embodiment of the present invention.

Referring to FIG. 3, a bracket (30) of the present invention is mounted to the brake rotor (36) by at least one mounting screw (31). The locking pin (32) holds the brake bolt (34) in place in the bracket (30). In a locked state, the deadbolt shaft (34B) extends from the brake bolt body (34A) and into a ventilation hole (38) of the brake rotor (36) to prevent rotation of the rotor (36) and hence the wheel or track, thereby locking the vehicle. One or more light emitting diodes (LED's) (34C) may be mounted on the brake bolt body (34A) or the bracket (30) to indicate to the user whether or not the lock is engaged for added safety and security. In this embodiment, a key (33), which is preferably a four-way key, is inserted into a keyhole of the key cylinder (37) and turned to engage and disengage the lock. In one embodiment of the engagement mechanism, the key (33) unlocks the brake bolt (34) by releasing the locking pin (32) from the locked position. The key cylinder (37) is mounted in the body of the bracket (30) itself. In this embodiment, the only part that has a positive engaging lock is the brake bolt body (34A).

Figure 4:
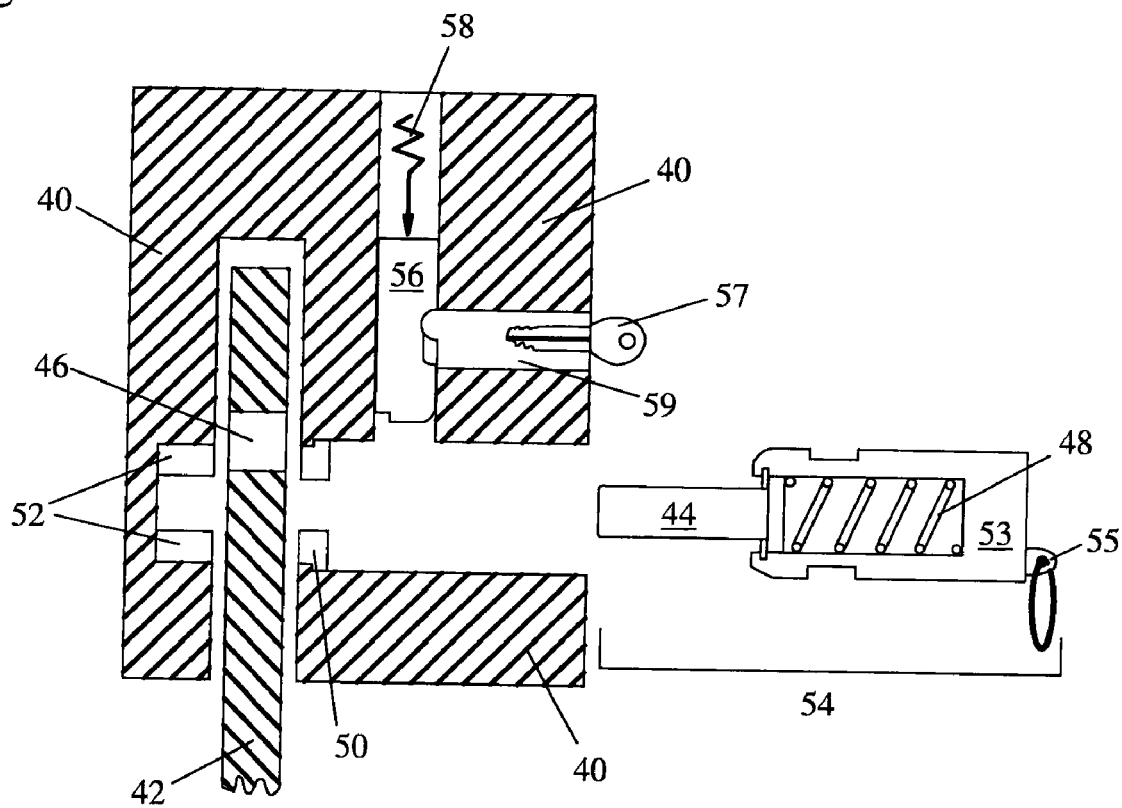
FIG. 4 shows a first lock mechanism of the present invention in an unlocked state with the brake bolt removed.

Several different mechanisms may be used with the present invention to engage and disengage the vehicle lock. In a first embodiment, shown in FIG. 4 through FIG. 6, a key manually unlocks the brake bolt and retraction of the spring-loaded locking pin allows the brake bolt assembly, including the deadbolt and the deadbolt spring to be removed from the bracket. Referring to FIG. 4, a lock mechanism of the present invention is preferably located in the bracket (40), which is mounted in place of the original bracket of the vehicle. The mounted bracket (40) preferably surrounds at least part of the brake rotor (42). To disengage the lock for use of the vehicle, the user inserts and turns the key (57), which is preferably a multi-combination key with four key-ways, to turn the key cylinder (59). This retracts the locking pin (56) and allows the user to remove the brake bolt (54), which includes the deadbolt (44), the deadbolt spring (48), and the brake bolt body (53), from the bracket (40). The assembly preferably includes a pull ring (55) attached to the brake bolt body (53) to allow the user to remove the assembly (54) from the bracket (40). When the lock is unlocked, the brake bolt (54), which is preferably compact and lightweight, can be easily stored by the owner, for example in the owner's pocket. In a preferred embodiment, the pull ring (55) is a keychain loop, so that the brake bolt (54) may be easily stored, for example by fastening the brake bolt to the owner's belt or another keychain.

Figure 5:
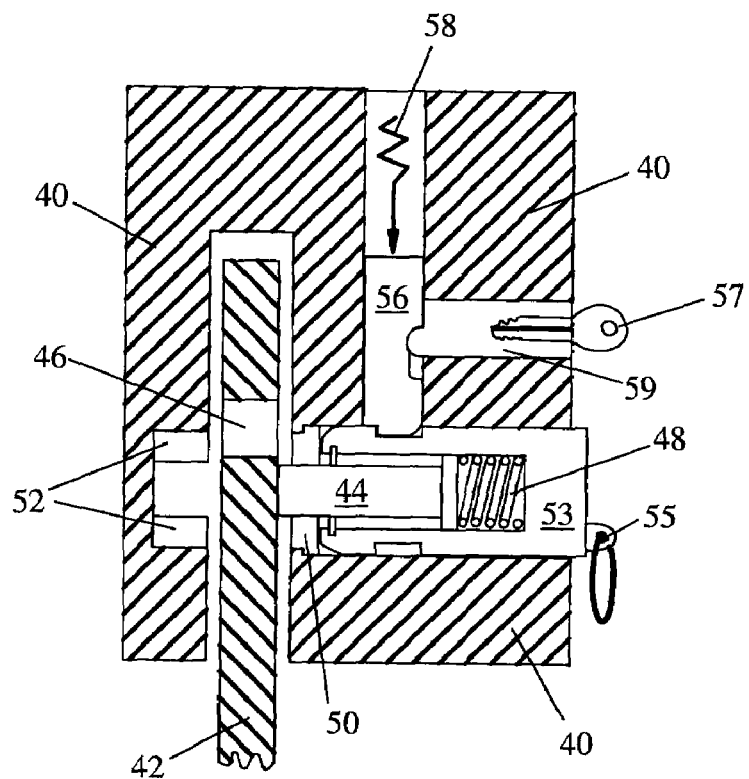
FIG. 5 shows the lock mechanism of FIG. 4 in an unlocked state with the brake bolt attached.

Referring to FIG. 5, to engage the lock, the user first inserts the brake bolt (54) into the bracket (40) and turns the key (57) to the lock position. This turns the key cylinder (59) to allow the locking pin spring (58) to urge the locking pin (56) toward the brake bolt (54) and engage the brake bolt body (53) so that it holds the brake bolt (54) in place.

Figure 6:
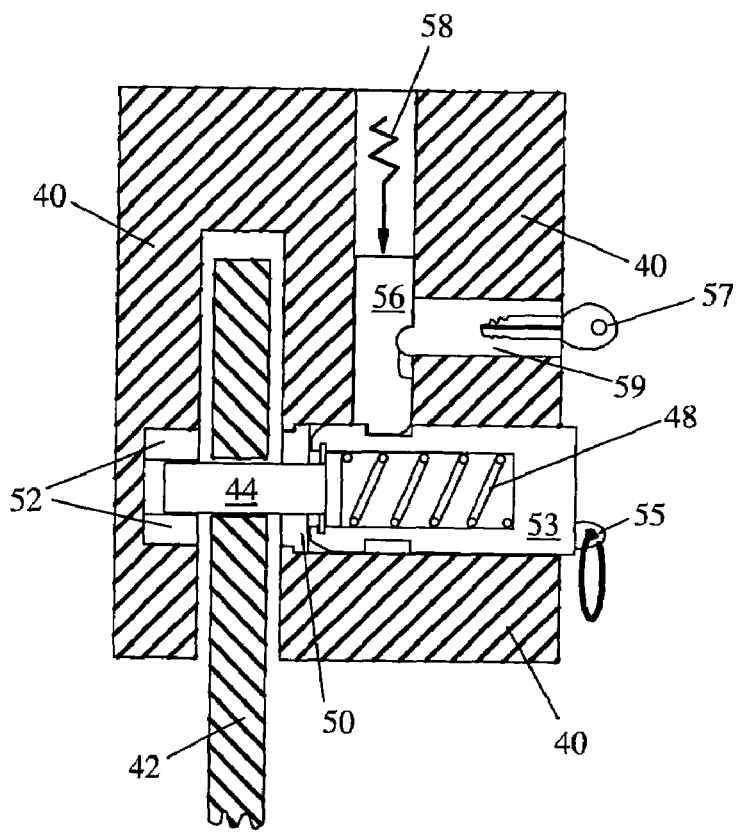
FIG. 6 shows the lock mechanism of FIG. 4 in a locked state.
Figure 7:
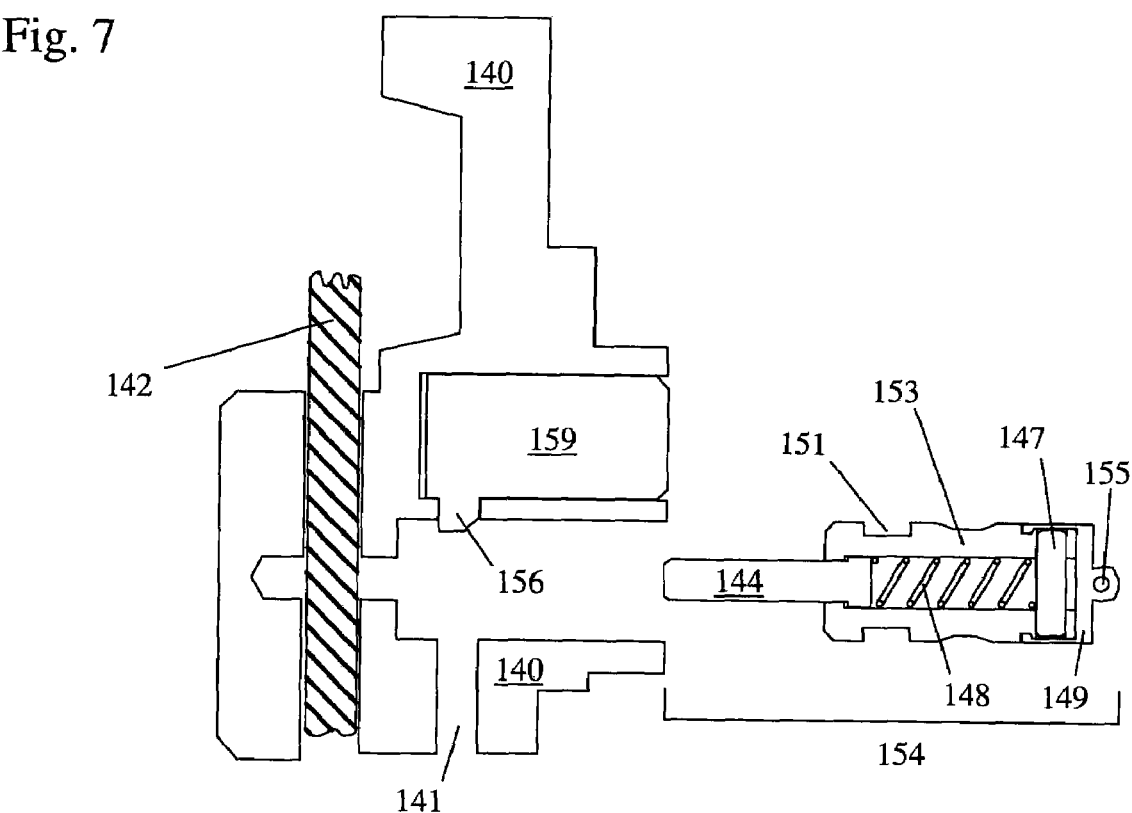
FIG. 7 shows a second lock mechanism of the present invention in an unlocked state with the brake bolt removed.

Referring to FIG. 6, to complete the engagement of the lock, since the brake rotor (42) rotates with respect to the bracket (40) when unlocked, to lock the vehicle the user rolls the vehicle forward or backward until one of the ventilation holes (42) lines up with the deadbolt shaft (44). When the shaft (44) is aligned with a hole (42), the deadbolt spring (48) urges the shaft (44) through the hole (42) to engage the lock and prevent further movement of the brake rotor (42). The deadbolt (44) preferably extends into bushings (50, 52), which are preferably made of hardened steel, on either side of the brake rotor (42) to increase the strength of the lock. The deadbolt spring (48) is mounted in the brake bolt (54). The brake bolt (54) is held in position by the locking pin (56) that is urged toward the brake bolt (54) by the locking pin spring (58).

Referring to FIG. 7 through FIG. 10, in a second embodiment of a locking mechanism with a removable brake bolt (154), a diameter groove (151) in the brake bolt body (153) and a security pin (147) under the brake bolt cap (149) increase the security of the engaged locking mechanism by inhibiting a drilling attack to the brake bolt (154). The security pin (147) is preferably made of hardened steel and inhibits drilling farther into the brake bolt body (153) or into the deadbolt (144). The diameter groove (151) preferably goes completely around the brake bolt body (153) so that drilling tends only to spin the brake bolt (154) when it is locked in position in the bracket (140) by the locking pin (156). The bracket (140) further includes a drain passage (141).

Figure 8:
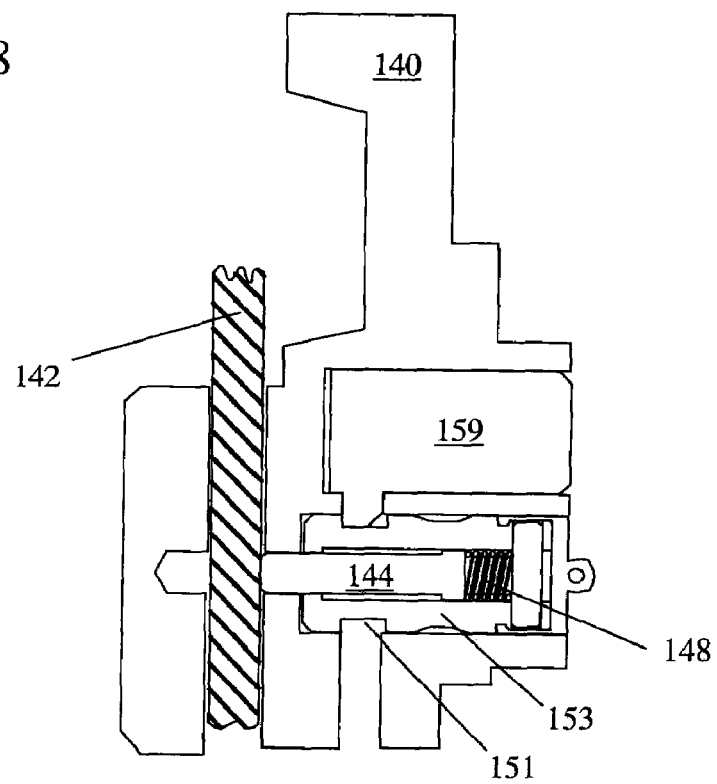
FIG. 8 shows the lock mechanism of FIG. 7 in an unlocked state with the brake bolt attached.

The locking mechanism preferably allows for one-handed locking and unlocking of the vehicle lock. As shown in an unlocked state in FIG. 7, the locking pin (156) is preferably spring-loaded to extend from the lock cylinder (159) into the brake bolt bore when no key is in the lock cylinder (159). One-handed insertion of the brake bolt (154) into the brake bolt bore, as shown in FIG. 8, causes retraction of the deadbolt (144) into the brake bolt body (153) and subsequent compression of the pressure spring (148), assuming that the deadbolt (144) does not happen to line up with a ventilation hole in the rotor (142), until the diameter groove (151) lines up with the locking pin (156). At this point, as shown in FIG. 8, the vehicle is locked even though the deadbolt (144) does not extend through a ventilation hole in the rotor (142).

Figure 9:
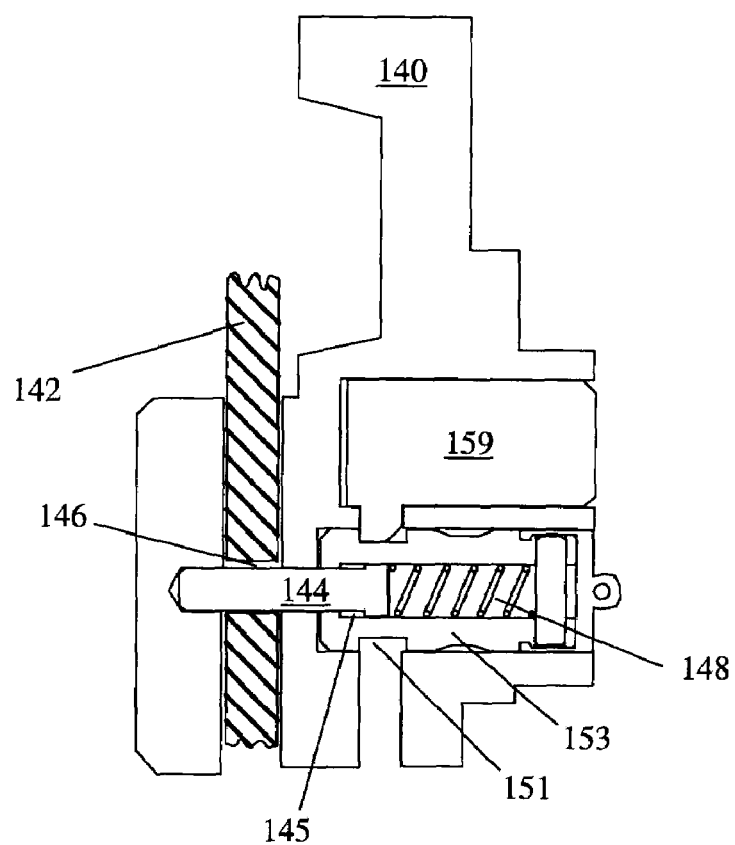
FIG. 9 shows the lock mechanism of FIG. 7 in a locked state.
Figure 10:
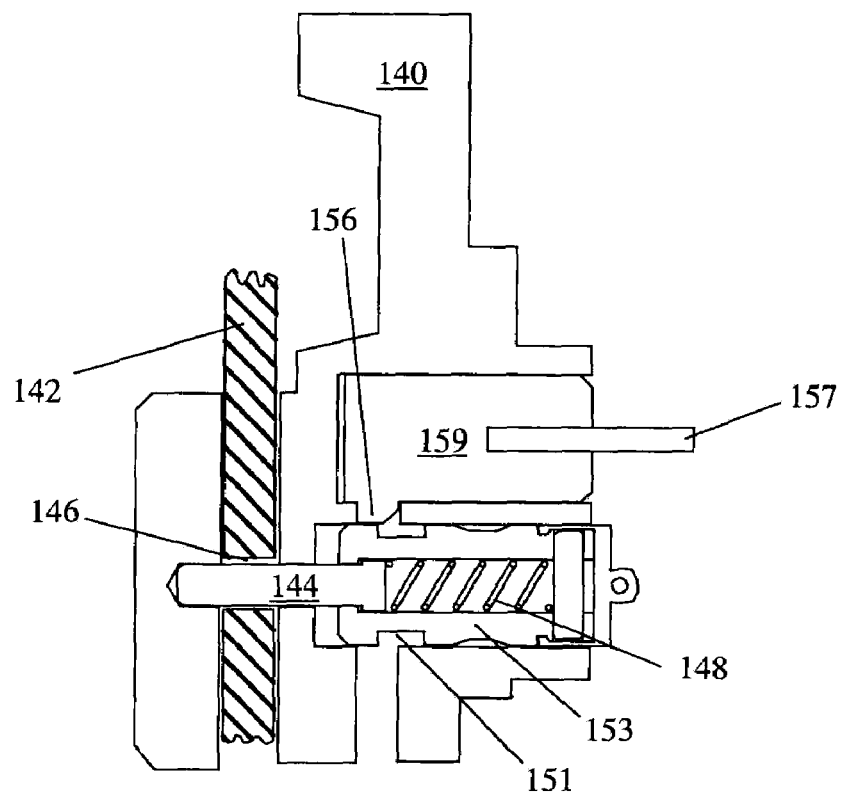
FIG. 10 shows the lock mechanism of FIG. 7 after the key is turned to retract the lock bolt.

As shown in FIG. 9, the vehicle user may move the vehicle until a ventilation hole (146) lines up with the deadbolt (144) to achieve a positive lock, but if the user forgets this step, any potential thief who tries to roll the vehicle away would engage the lock, locking the wheel and preventing further rolling of the vehicle. The pressure spring (148) provides for this feature. As also shown in FIG. 9, the brake bolt (154) is preferably designed so that in the positive lock state, a pressure gap (145) remains between the head of the deadbolt (144) and the end of the brake bolt body (153). This feature allows for one-handed unlocking of the vehicle by use of a key (157) in the lock cylinder (159), which retracts the locking pin (156). When the locking pin (156) retracts, the pressure gap (145) allows the pressure spring (148) to extend farther until the head of the deadbolt (144) contacts the end of the brake bolt body (153), as shown in FIG. 10. Since the deadbolt (144) can not extend farther into the bracket (140), the brake bolt body (153) instead moves outward from the brake bolt bore so that after the key (157) is released, the user manually pulls the unlocked brake bolt (154) out of the bracket (140) prior to use of the vehicle.

Figure 11:
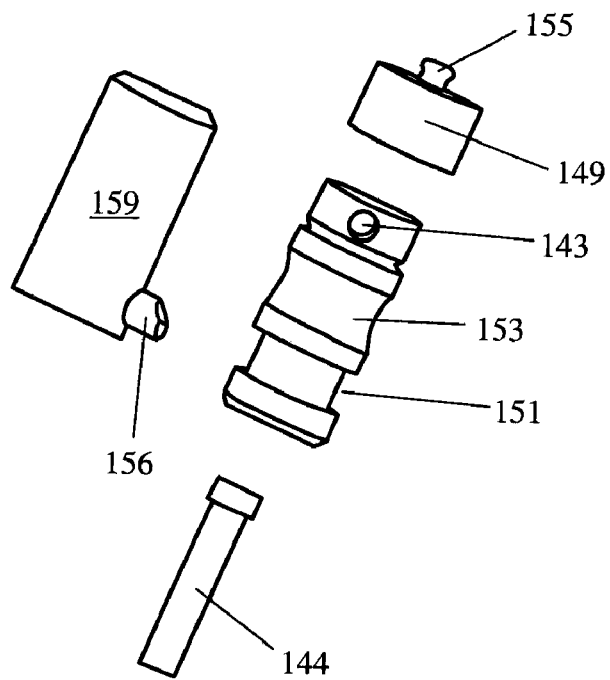
FIG. 11 shows an exploded view of the lock mechanism of FIG. 7.

In the exploded view of the brake bolt (154) and the lock cylinder (159) in FIG. 11, the security pin bore (143) is visible in the brake bolt body (153). For assembly of the brake bolt (154), the deadbolt (144) is first inserted into the deadbolt bore down the center of the brake bolt body (153) followed by the pressure spring (148). The pressure spring (148) is then held down in the deadbolt bore while the security pin (147) is inserted into the security pin bore (143). Finally, the brake bolt cap (149) is placed over the end of the brake bolt body (153), covering the security pin (147), and is swaged or crimped into place on the brake bolt body (153).

Figure 12:
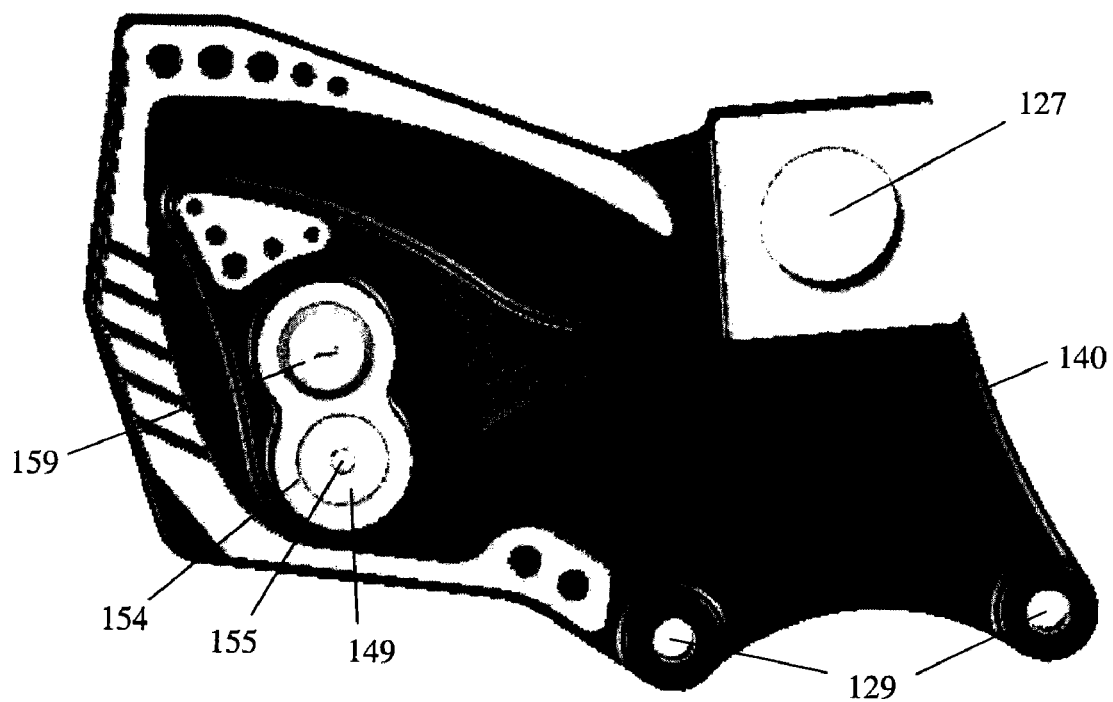
FIG. 12 shows a front view of a lock of the present invention having the lock mechanism of FIG. 7.

The front view of a preferred design of the vehicle lock is shown in FIG. 12. The relative locations of the lock cylinder (159), the brake bolt (154), the axle hole (127), and the caliper mounting holes (129) on the bracket (140) are shown. A custom bracket (140) is preferably designed for each make and model of vehicle.

Figure 13:
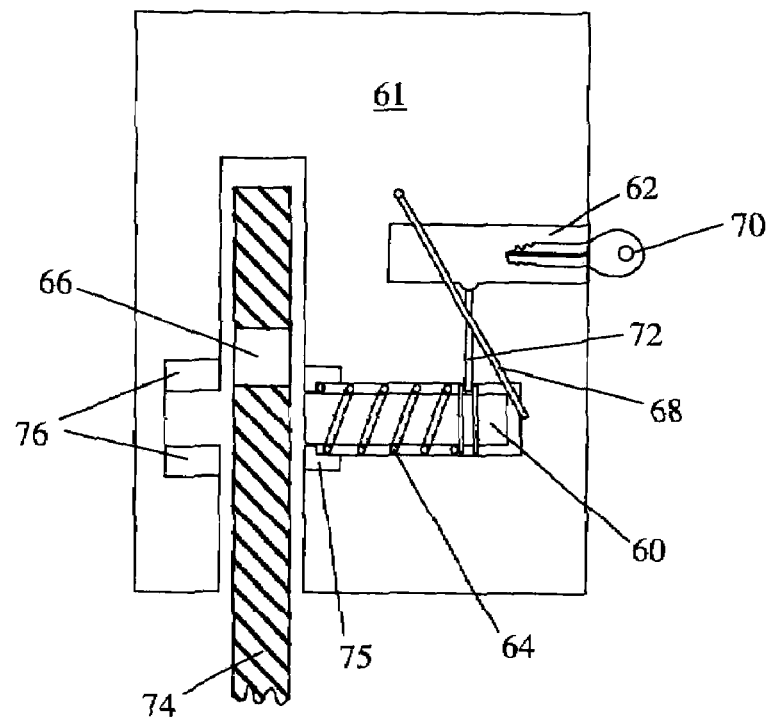
FIG. 13 shows a third lock mechanism of the present invention in an unlocked state.

In a third engagement embodiment, the deadbolt (60) is an internal part of the mounted bracket (61). In an unlocked state as shown in FIG. 13, the lock cylinder (62) is positioned such that the deadbolt retainer spring (64) has extended to retract the deadbolt (60) from the ventilation hole (66) and to move the hinged pin engagement bar (68) to the unlock position. When the key (70) and lock cylinder (62) are completely turned to release the lock, the fail-safe lock out plate (72) secures the internal deadbolt (60) to prevent accidental engagement while the lock is not in use.

Figure 14:
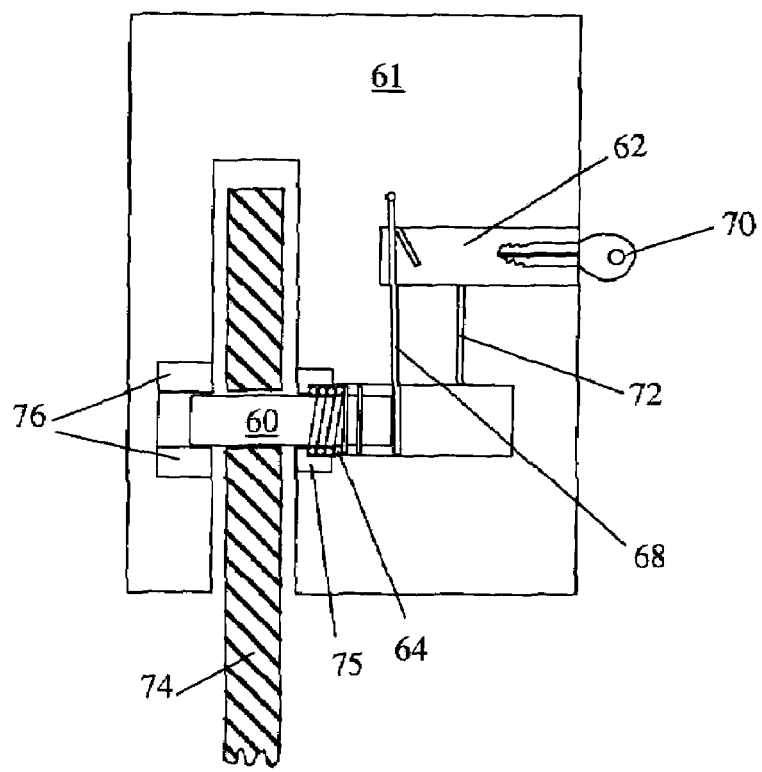
FIG. 14 shows the lock mechanism of FIG. 13 in a locked state.

To go to the locked position of FIG. 14, the lock cylinder (62) is turned with the appropriate key (70), which retracts the fail-safe lock out plate (72) and depresses the hinged pin engagement bar (68) pressing on the internal deadbolt (60), going through the ventilation rotor hole (66) of the brake rotor (74). The key then turns in reverse to take pressure off the hinged pin engagement bar, allowing the internal pin (60) to be retracted by the internal pin retainer spring (64). As in the previous embodiment, the deadbolt (60) preferably extends into bushings (75, 76), which are preferably made of hardened steel, on either side of the brake rotor (74) to increase the strength of the lock.

The deadbolt (60) remains mounted in the bracket (61) in both a locked and an unlocked state. The key (70) is the only removable part, allowing for even more convenience when it comes to lock storage. Although a specific pin extraction mechanism and fail-safe lock out mechanism are shown in this embodiment, other extraction and lock out mechanisms may be used within the spirit of the present invention. In an alternate embodiment, the lock cylinder may be directly attached to the deadbolt shaft to apply the pressure needed to push the shaft through the ventilation hole, allowing the rotor to be locked. In an alternate embodiment, a plate covers the brake bolt hole in the lock bracket to secure the brake bolt inside the housing to eliminate accidental engagement.

In a fourth engagement embodiment, the lock is engaged and disengaged electronically. When the user turns on the ignition, the lock disengages, and when the user turns off the ignition, the lock engages. The lock is preferably wired in with the electronics on the vehicle. When the ignition is turned on, the solenoid acts as the lock cylinder, facilitating all the internal movements of the deadbolt and the metal plate blocking the accidental engagement. The installation may be done by the owner and purchaser. If the lock is wired in with the vehicle's electronics, then dealer installation is preferable. The electronic control may additionally use radio frequency identification (RFID) technology with an external power source for an increased level of security and correct owner identification. The RFID also eliminates the need to use the motorcycle's power supply for correct lock function. If the lock uses RFID technology, the installation is similar to installation of the mechanical key embodiments. No wiring is necessary because the power source is external. In this embodiment, the entire vehicle lock is permanently mounted to the vehicle, and the user does not even need to carry a key for the vehicle lock.

For any of these embodiments, one or more light-emitting diodes (LED's) may be housed in the brake bolt or the bracket to indicate to the user whether or not the lock is engaged for added safety and security.

Although the above-described embodiments include only a single deadbolt engaging the rotor, multiple deadbolts may be used to engage multiple ventilation holes in the rotor simultaneously for increased security within the spirit of the present invention.

In the following embodiments, the brake bolt and the lock cylinder are mounted in various parts of the vehicle for preventing the rotation of a wheel of the vehicle in a locked state. In various embodiments, the brake bolt and lock cylinder are mounted in a brake bolt bore and a lock bore, respectively, located in the swing arm, the chain guard, or a lock body mounted over the axle-retaining nut. In various embodiments, the vehicle lock engages a ventilation hole on the rotor, a ventilation hole on the sprocket, the teeth of the sprocket, or a hole on the hub to prevent rotation of the wheel in the locked state. Preferably, the lock cylinder is mounted to the vehicle in both the locked state and the unlocked state, and in the unlocked state the brake bolt is removed from the brake bolt bore for operation of the vehicle.

Figure 15:
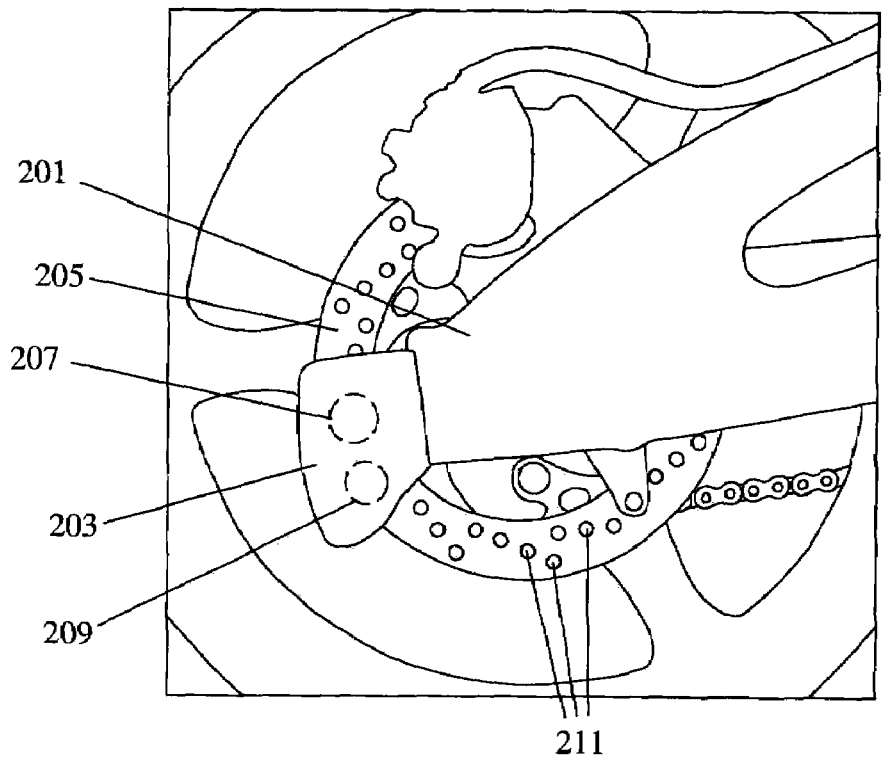
FIG. 15 shows a swing arm lock for engaging the rotor to lock the vehicle.
Figure 16:
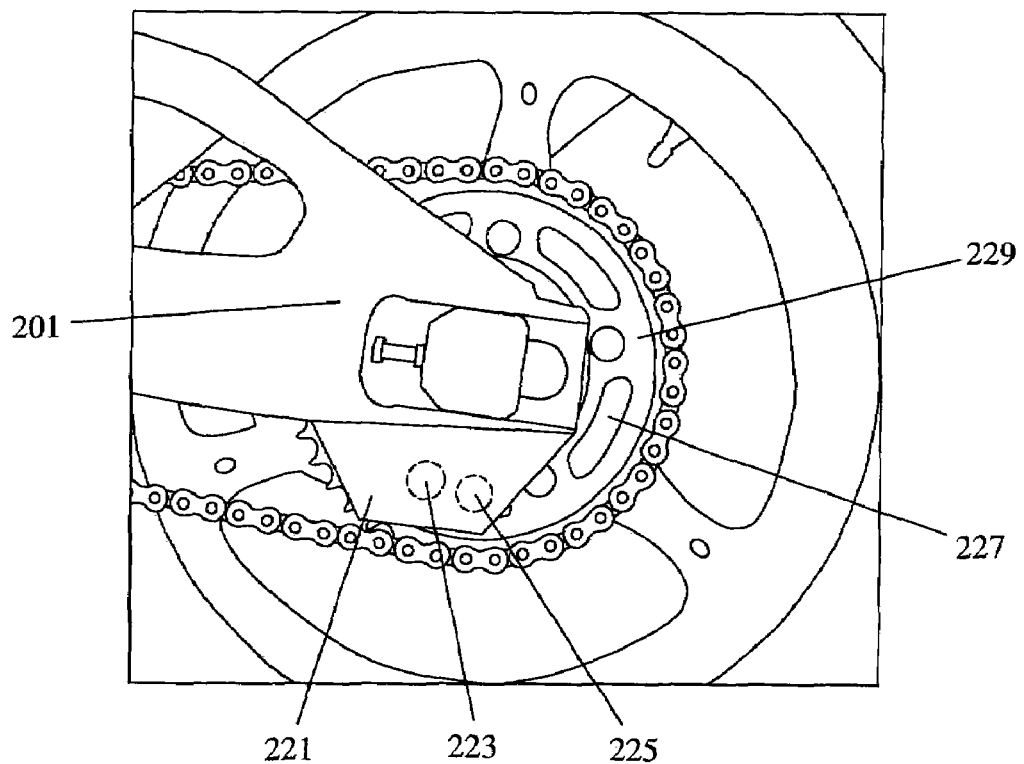
FIG. 16 shows a swing arm lock for engaging the sprocket to lock the vehicle.

In a fifth embodiment of the present invention, the vehicle lock is part of the swing arm. As shown in FIG. 15, the inside of the swing arm (201) is preferably adapted or manufactured as original equipment to include a slot (203), preferably molded out of cast or milled aluminum or steel, which encases the front portion of the rear brake rotor (205). Two bores (207, 209) through the swing arm are placed proportional to a ring of ventilation holes on the rotor. The lock bore (207) houses the lock cylinder, while the brake bolt bore (209) houses the brake bolt with a spring-loaded locking pin. In this embodiment, when the spring-loaded pin is engaged, it engages one of the rear rotor ventilation holes (211), locking the vehicle into place. In an alternate embodiment as shown in FIG. 16, the slot (221), the lock bore (223) for the lock cylinder, and the brake bolt bore (225) for the spring-loaded locking pin are arranged such that the spring-loaded pin engages the ventilation holes (227) of the sprocket (229).

Figure 17:
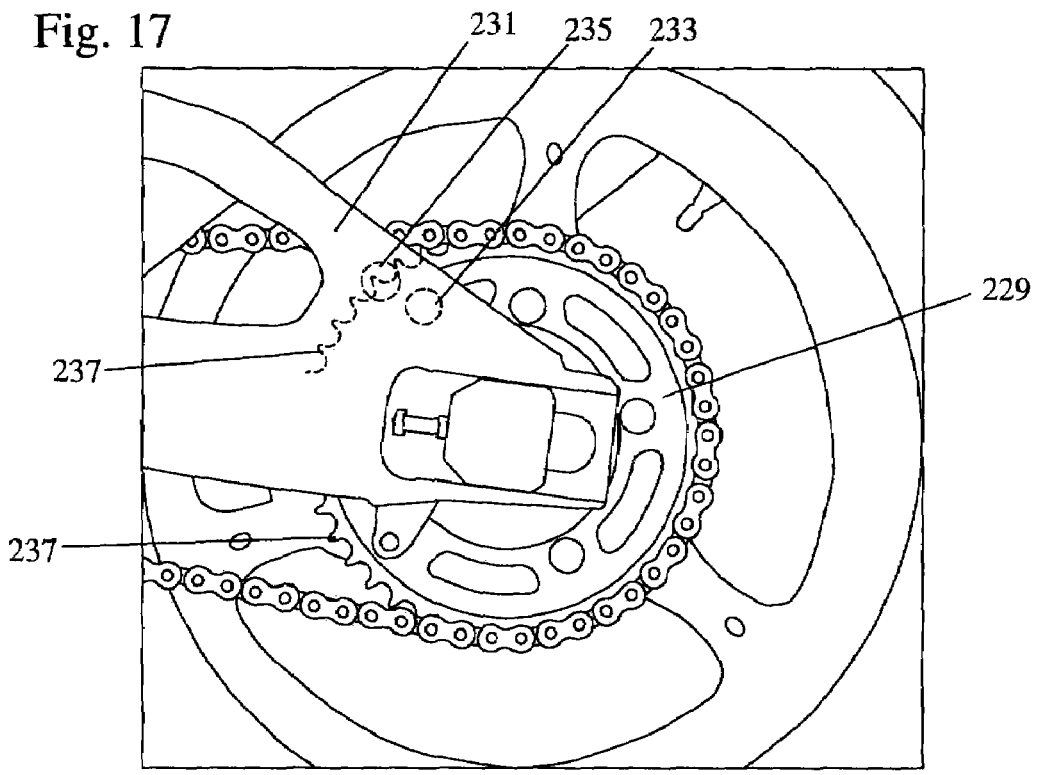
FIG. 17 shows a chain guard lock for engaging the ventilation holes of the sprocket.

In a sixth embodiment, as shown in FIG. 17, the vehicle lock is part of the chain guard (231). In this embodiment, the two bores (233, 235) are preferably proportional to the teeth (237) of the sprocket (229). The lock bore (233) houses the lock cylinder, while the brake bolt bore (235) houses a spring-loaded locking pin. The end of this locking mechanism is preferably shaped such that it locks in between several teeth (237) of the sprocket (229). When this happens, the sprocket engages the lock and keeps the vehicle from being moved. In one embodiment, when disengaged, the pin still remains in the bore but out of distance from the sprocket, and a latch on the outside of the chain guard snaps around the locking pin ensures that the locking pin does not engage while the vehicle is in motion. In another embodiment, the locking pin is removed from the brake bolt bore when the lock is disengaged.

Figure 18:
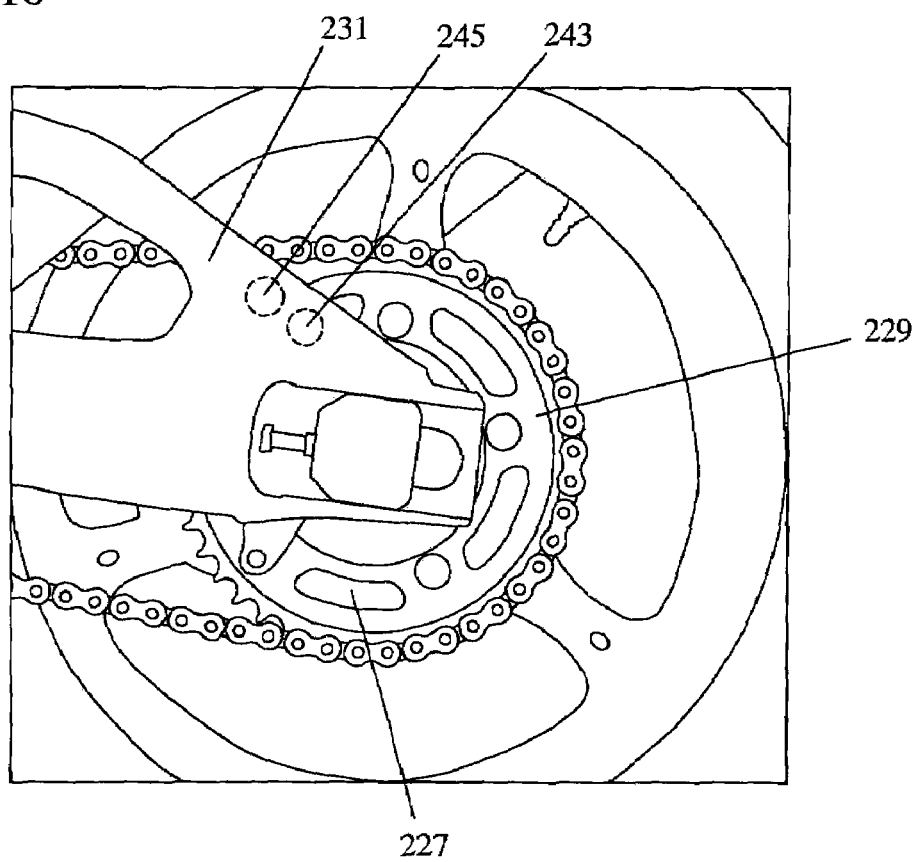
FIG. 18 shows a chain guard lock for engaging the teeth of the sprocket.

In a seventh embodiment, as shown in FIG. 18, the vehicle lock is again part of the chain guard (231). This embodiment is similar to the one previously mentioned, however, the spring loaded locking pin is designed differently. As opposed to a pin that locks into the teeth of the sprocket, in this embodiment the pin locks into the ventilation holes (227) of the sprocket (229). This necessitates the brake bolt bore (243) being farther back on the chain guard (231) than in the previous embodiment such that the brake bolt bore (243) housing the locking pin lines up proportional to the ventilation areas of the sprocket. The lock bore (245) may be located farther out on the chain guard (231), as shown in FIG. 18, or on the other side of the brake bolt bore (243). The end of this locking pin is preferably two-pronged, with the distance between the prongs being equal to the length of the ventilation area. When engaged, this pin locks into one of the sprocket ventilation holes (227), thus preventing any movement of the vehicle. When disengaged, the pin may remain in the bore, however, out of distance from the sprocket with a latch on the outside of the chain guard that snaps around the locking pin to ensure that the locking pin does not engage while the vehicle is in motion. Alternatively, the locking pin may be removed from the bore (243) in the unlocked state.

Figure 19:
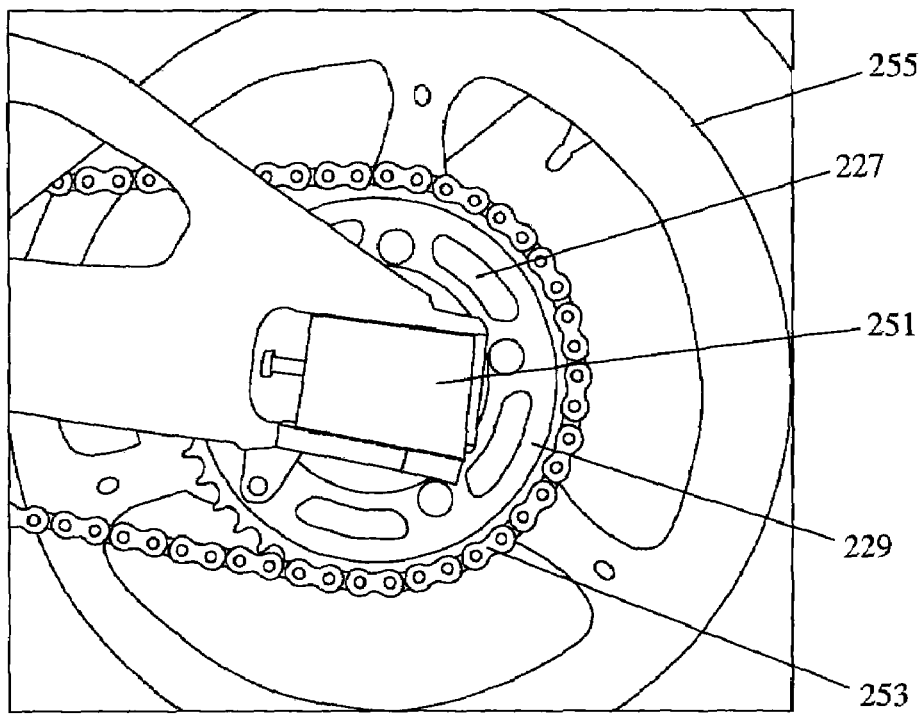
FIG. 19 shows an axle lock in an unlocked position for engaging the ventilation holes of the sprocket.
Figure 20:
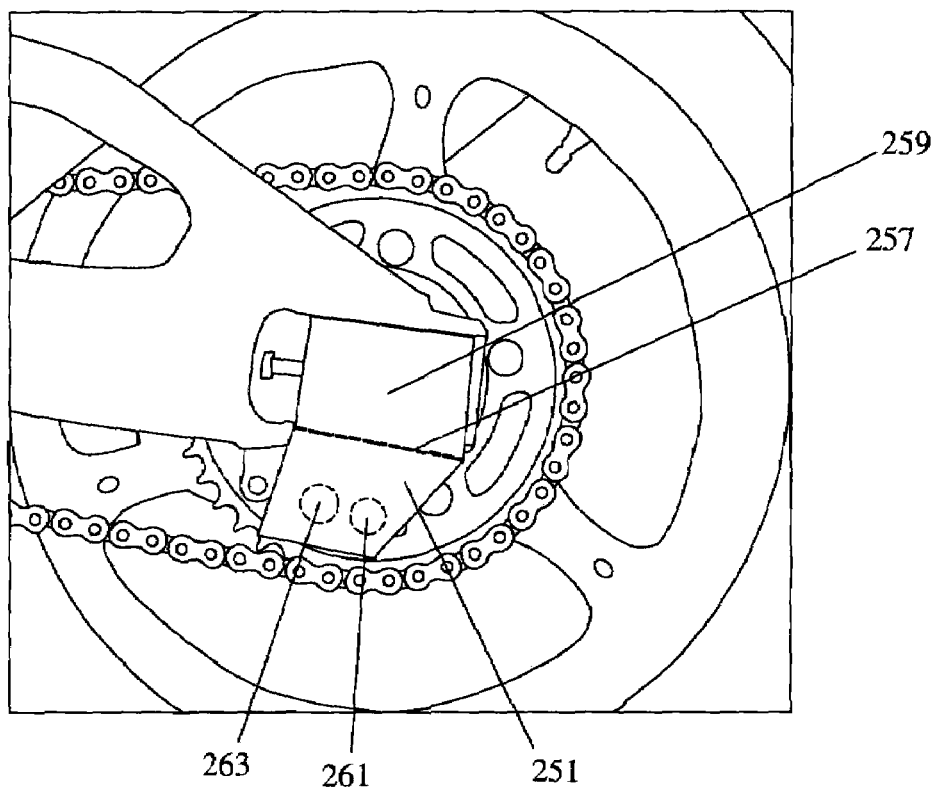
FIG. 20 shows the lock of FIG. 19 in a locked position.

In an eighth embodiment, as shown in FIG. 19 and FIG. 20, a hinged lock body (251) is located over the axle retaining nut, securing the chain (253), the sprocket (229), and the wheel (255) of the vehicle. When disengaged, this mechanism folds at the hinge (257) and snaps over the attached portion (259) of the mechanism located over the axle opening. When engaged, as shown in FIG. 20, the mechanism folds at the hinge (257), placing a two-pronged lock into one of the ventilation areas (227) of the sprocket (229) and thereby locking the vehicle into place. Preferred locations for the brake bolt bore (261) and the lock bore (263) are shown in FIG. 20. Another plate is preferably placed over the hinged point of the lock in order to prevent the hinged area from being moved.

Figure 21:
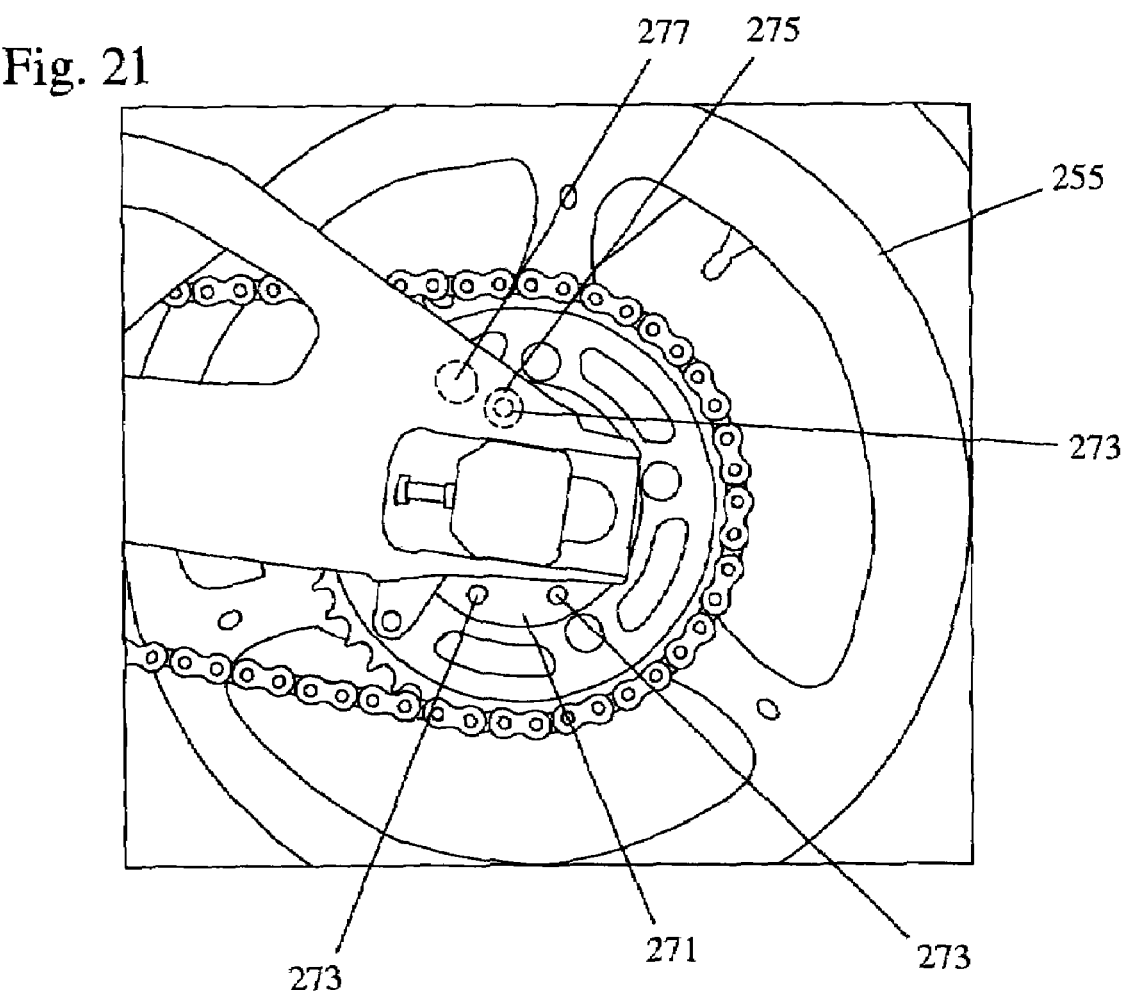
FIG. 21 shows a hub lock for engaging a hole in the hub to lock the vehicle.

In a ninth embodiment of the present invention, as shown in FIG. 21, the vehicle lock engages the hub (271) of the wheel (255) to eliminate wheel movement. The hub of the wheel is adapted or manufactured as original equipment with recesses or holes (273) to allow the locking mechanism to engage the hub to prevent movement. Preferred locations for the brake bolt bore (275) and the lock bore (277) are shown in FIG. 20.

Although a number of specific embodiments of a vehicle lock of the present invention have been shown, any lock body mounted to the vehicle which locks the vehicle by eliminating the rotation of the tire may be used within the spirit of the present invention.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A vehicle lock for a vehicle having at least one wheel or track, the vehicle lock comprising:
    a lock cylinder mounted to the vehicle in a lock bore in both a locked state and an unlocked state;
    a brake bolt comprising at least one deadbolt shaft and mounted in a brake bolt bore in the locked state;
        wherein in the unlocked state the brake bolt is removed from the brake bolt bore for operation of the vehicle; and
        wherein in the locked state the deadbolt shaft is aligned to extend into at least one recess, thereby preventing rotation of the wheel or track; and
    a lock body comprising:
        an attached portion mounted over an axle-retaining nut of the wheel or track;
        a hinged portion rotatably connected to the attached portion by a hinge; wherein the lock bore and the deadbolt bore are located in the hinged portion such that in the locked state the hinged portion is extended away from the attached portion and the deadbolt shaft is aligned to extend into the at least one recess.

2. The vehicle lock of claim 1, wherein the lock bore and the deadbolt bore are located in a swing arm of the vehicle.

3. The vehicle lock of claim 1, wherein the lock bore and the deadbolt bore are located in an extension of a swing arm of the vehicle.

4. The vehicle lock of claim 1, wherein the lock bore and the deadbolt bore are located in a chain guard of the vehicle.

5. The vehicle lock of claim 1, wherein the at least one recess is at least one ventilation hole in a brake rotor of the wheel or track.

6. The vehicle lock of claim 1, wherein the at least one recess is at least one ventilation hole in a sprocket of the wheel or track.

7. The vehicle lock of claim 1, wherein the at least one recess is at least one gap between a pair of teeth in a sprocket of the wheel or track.

8. The vehicle lock of claim 1, wherein the at least one recess is at least one hole in a hub of the wheel or track.

* * * * *